United States Patent [19] Tang et al.

(10) Patent No.: US 11,238,286 B2
(45) Date of Patent: Feb. 1, 2022

(54) AUTOMATICALLY DETECTING CONTENTS EXPRESSING EMOTIONS FROM A VIDEO AND ENRICHING AN IMAGE INDEX

(71) Applicant: Microsoft Technology Licensing, LLC, Redmond, WA (US)

(72) Inventors: Yilong Tang, Redmond, WA (US); Bo Han, San Gabriel, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 73 days.

(21) Appl. No.: 16/342,496

(22) PCT Filed: Oct. 28, 2016

(86) PCT No.: PCT/CN2016/107456
§ 371 (c)(1),
(2) Date: Apr. 16, 2019

(87) PCT Pub. No.: WO2018/094723
PCT Pub. Date: May 31, 2018

(65) Prior Publication Data
US 2019/0266406 A1    Aug. 29, 2019

(51) Int. Cl.
*G06K 9/00* (2006.01)
*G06F 16/71* (2019.01)
(Continued)

(52) U.S. Cl.
CPC ......... *G06K 9/00718* (2013.01); *G06F 16/51* (2019.01); *G06F 16/532* (2019.01);
(Continued)

(58) Field of Classification Search
CPC .................. G06K 9/00718; G06F 16/784
See application file for complete search history.

(56) References Cited

U.S. PATENT DOCUMENTS 6,400,890 B1   6/2002   Nagasaka et al.
7,302,117 B2   11/2007  Sekiguchi et al.
(Continued)

FOREIGN PATENT DOCUMENTS

CN   101021904 A   8/2007
CN   102222227 A   10/2011
(Continued)

OTHER PUBLICATIONS

Hauptmann, et al., "Video-cuebik: adapting image search to video shots", In Proceedings of the 2nd ACM/IEEE-CS joint conference on Digital libraries, Jul. 13, 2002, pp. 156-157.
(Continued)

*Primary Examiner* — Santiago Garcia
(74) *Attorney, Agent, or Firm* — Schwegman Lundberg & Woessner, P.A.

(57) ABSTRACT

The present disclosure provides method, apparatus and system for detecting contents expressing emotions from a video. The method may comprise: dividing the video into a plurality of clips; extracting, from a first clip and at least one second clip of the plurality of clips, features associated with the first clip; determining whether the first clip expresses emotions based on the features associated with the first clip; and building an index containing the first clip based on the features associated with the first clip if the first clip expresses emotions.

20 Claims, 4 Drawing Sheets

(51) Int. Cl.
*G06F 16/953* (2019.01)
*G06F 16/51* (2019.01)
*G06F 16/532* (2019.01)
*G06F 16/738* (2019.01)
*G06F 16/783* (2019.01)

(52) U.S. Cl.
CPC ............ *G06F 16/71* (2019.01); *G06F 16/739* (2019.01); *G06F 16/784* (2019.01); *G06F 16/953* (2019.01); *G06K 9/00744* (2013.01)

(56) References Cited

U.S. PATENT DOCUMENTS

| | | | |
|---|---|---|---|
| 7,848,598 B2 | 12/2010 | Nagatani et al. | |
| 7,917,514 B2 | 3/2011 | Lawler et al. | |
| 8,477,836 B2 | 7/2013 | Yoon et al. | |
| 9,098,533 B2 | 8/2015 | Hammontree et al. | |
| 9,110,501 B2 | 8/2015 | Velusamy et al. | |
| 9,124,856 B2 | 9/2015 | Deshpande et al. | |
| 10,191,920 B1* | 1/2019 | Grundmann | G06T 11/60 |
| 10,546,011 B1* | 1/2020 | Dunham | G10L 15/1822 |
| 2003/0118974 A1* | 6/2003 | Obrador | G09B 23/28 |
| | | | 434/236 |
| 2003/0187642 A1* | 10/2003 | Ponceleon | G10L 15/1822 |
| | | | 704/252 |
| 2005/0071746 A1* | 3/2005 | Hart | G06F 3/1209 |
| | | | 715/200 |
| 2009/0080853 A1* | 3/2009 | Chen | G06F 16/785 |
| | | | 386/241 |
| 2013/0166587 A1 | 6/2013 | Berry | |
| 2014/0086554 A1* | 3/2014 | Yehezkel | H04N 21/8549 |
| | | | 386/241 |
| 2014/0244252 A1* | 8/2014 | Dines | G10L 15/183 |
| | | | 704/235 |
| 2014/0250110 A1 | 9/2014 | Yang et al. | |
| 2014/0282237 A1* | 9/2014 | Fuzell-Casey | G06Q 30/0601 |
| | | | 715/810 |
| 2015/0082349 A1 | 3/2015 | Ishtiaq et al. | |
| 2015/0110471 A1 | 4/2015 | Zheng | |
| 2015/0169558 A1 | 6/2015 | Zhao et al. | |
| 2015/0206523 A1* | 7/2015 | Song | G10H 1/0008 |
| | | | 84/609 |
| 2015/0245111 A1 | 8/2015 | Berry et al. | |
| 2016/0066055 A1* | 3/2016 | Nir | H04N 21/439 |
| | | | 725/35 |
| 2017/0371496 A1* | 12/2017 | Denoue | G06T 11/60 |
| 2018/0018507 A1* | 1/2018 | Chetlur | H04N 21/44008 |
| 2018/0025221 A1* | 1/2018 | Harpur | G06K 9/00718 |
| | | | 382/116 |
| 2018/0077440 A1* | 3/2018 | Wadhera | H04N 21/26283 |

FOREIGN PATENT DOCUMENTS

| | | |
|---|---|---|
| CN | 103200463 A | 7/2013 |
| CN | 103761284 A | 4/2014 |
| CN | 104541514 A | 4/2015 |
| EP | 1374097 A1 | 1/2004 |
| WO | 2011148149 A1 | 12/2011 |

OTHER PUBLICATIONS

"International Search Report and Written Opinion issued in PCT Application No. PCT/CN16/107456", dated Aug. 23, 2017, 11 Pages.

Sandhyarani, et al., "Retrieving Stream of Video Frames Using Query Processing", In International Journal of Scientific and Research Publications, vol. 2, Issue 6, Jun. 2012, 4 Pages.

"Extended European Search Report Issued in European Patent Application No. 16922433.4", dated Mar. 30, 2020, 9 Pages.

Cohn, et al., "Bimodal Expression of Emotion by Face and Voice", In Proceedings of The Sixth ACM International Conference on Multimedia: Face/gesture Recognition and their Applications, Sep. 1998, 5 Pages.

"First Office Action and Search Report Issued in Chinese Patent Application No. 201680082647.0", (w/ English Summary), dated May 31, 2021, 18 Pages.

* cited by examiner

AUTOMATICALLY DETECTING CONTENTS EXPRESSING EMOTIONS FROM A VIDEO AND ENRICHING AN IMAGE INDEX

CROSS-REFERENCE TO RELATED APPLICATIONS

This application is a U.S. National Stage Filing under 35 U.S.C. 371 of International Patent Application Serial No. PCT/CN2016/107456, filed Nov. 28, 2016, and published as WO 2018/094723 A1 on May 31, 2018, which application and publication are incorporated herein by reference in their entirety.

BACKGROUND

Recently, more and more people search images, such as GIF images and meme, which are expressive or interesting, to express themselves in a short message service (SMS), an email, a social networking service (SNS) and so on. These expressive images are traditionally created by people. The manual generation method results in very limited amount of good candidates. Moreover, in order to find these images created by people, the traditional search engine needs to crawl all web pages. Whether such an image can be found by the search engine relies on its spreading scale in the web.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In one aspect, the present disclosure provides a method for detecting contents expressing emotions from a video. The method may comprise: dividing the video into a plurality of clips; extracting, from a first clip and at least one second clip of the plurality of clips, features associated with the first clip; determining whether the first clip expresses emotions based on the features associated with the first clip; and building an index containing the first clip based on the features associated with the first clip if the first clip expresses emotions.

In another aspect, the present disclosure provides an apparatus for detecting contents expressing emotions from a video. The apparatus may comprise: a dividing module configured to divide the video into a plurality of clips; an extracting module configured to extract, from a first clip and at least one second clip of the plurality of clips, features associated with the first clip; a determining module configured to determine whether the first clip expresses emotions based on the features associated with the first clip; and a building module configured to build an index containing the first clip based on the features associated with the first clip if the first clip expresses emotions.

In another aspect, the present disclosure provides a method for enriching an image index. The method may comprise: dividing a video into a plurality of clips; extracting features from a first clip of the plurality of clips; determining whether there is at least one image from web pages which is similar to the first clip based on the features extracted from the first clip; and if there is the at least one image, enriching an image index containing the at least one image based on the features extracted from the first clip and the features extracted from at least one second clip of the plurality of clips.

In another aspect, the present disclosure provides an apparatus for enriching an image index. The apparatus may comprise: a dividing module configured to divide a video into a plurality of clips: an extracting module configured to extract features from a first clip of the plurality of clips; a determining module configured to determine whether there is at least one image from web pages which is similar to the first clip based on the features extracted from the first clip; and an enriching module configured to, if there is the at least one image, enrich an image index containing the at least one image based on the features extracted from the first clip and the features extracted from at least one second clip of the plurality of clips.

In another aspect, the present disclosure provides a system for detecting contents expressing emotions from a video. The system may comprise one or more processors and a memory. The memory may store computer-executable instructions that, when executed, cause the one or more processors to perform any steps of the method for detecting contents expressing emotions from a video according to various aspects of the present disclosure.

In another aspect, the present disclosure provides a system for enriching an image index. The system may comprise one or more processors and a memory. The memory may store computer-executable instructions that, when executed, cause the one or more processors to perform any steps of the method for enriching an image index according to various aspects of the present disclosure.

It should be noted that the above one or more aspects comprise the features hereinafter fully described and particularly pointed out in the claims. The following description and the drawings set forth in detail certain illustrative features of the one or more aspects. These features are only indicative of a few of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood these implementations are discussed only for enabling those skilled persons in the art to better understand and thus implement the embodiments of the present disclosure, rather than suggesting any limitations on the scope of the present disclosure.

More and more people search images, such as GIF images and meme, which can be used to express their emotions, to send to or share with others. This brings a big technical challenge to image search. A traditional search engine needs to crawl all the web pages to find these contents that are created by people. Whether such a content expressing emotions can be found relies on its spreading scale in the web. Someone must create and share the content first and the content must be spread in the web in a certain scale, otherwise the search engine will not understand its importance. Furthermore, the information about the original video from which the content origins has been lost in the second-creation content and it's hard to retrieve these media with video related searches.

In the present disclosure, a video may be divided into a plurality of clips. For each clip of the plurality of clips, features may be extracted from the clip. Then it may be determined whether one of the plurality of clips expresses emotions based on features associated with the clip including the features extracted from the clip and the features extracted from at least one other clip of the plurality of clips, such as at least one clip next to the clip. In the present disclosure, for each clip, the features extracted from the clip may be called as content features associated with the clip, and the features extracted from the clip next to it may be called as contextual features associated with the clip. If there is one or more clips expressing emotions among the plurality of clips, an index containing the one or more clips, such as a reverse index, may be built based on the features associated with the one or more clips. By this way, the contents expressing emotions may be found proactively from a video and the built index may contain rich information to help retrieval of the contents.

In the following discussion, an exemplary environment is first described in which the techniques described herein may be implemented. Exemplary illustrations of the various embodiments are then described, which may be employed in the exemplary environment, as well as in other environments. Accordingly, the exemplary environment is not limited to performing the described embodiments and the described embodiments are not limited to implementation in the exemplary environment.

Figure 1:
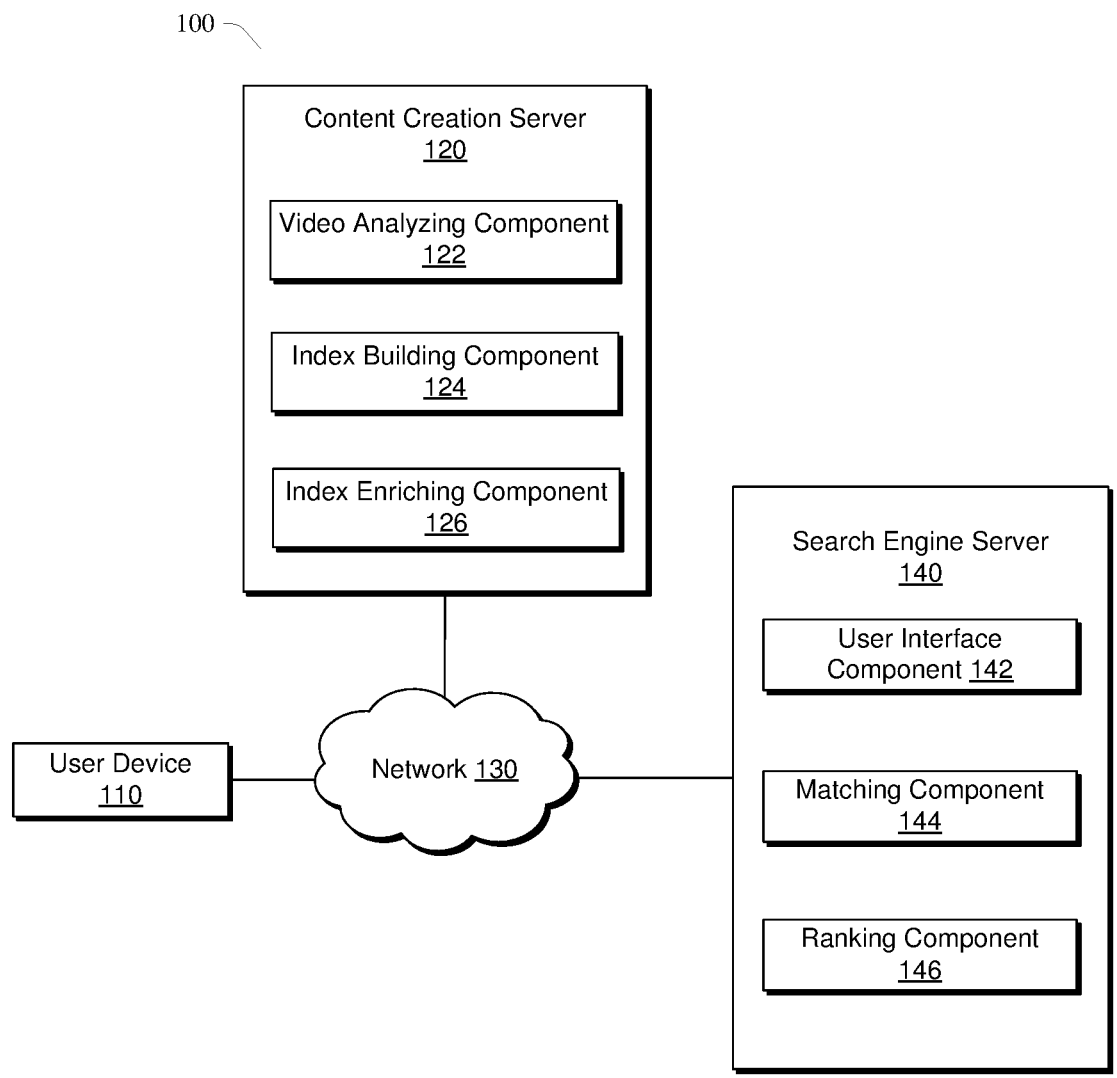
FIG. 1 illustrates an exemplary environment in which the techniques disclosed herein may be implemented.

FIG. 1 illustrates an exemplary environment 100 in which the techniques described in the present disclosure may be implemented. It should be understood that this and other arrangements described herein are set forth only as examples. Other arrangements and elements (e.g., machines, interfaces, functions and grouping of functions, etc.) can be used in addition to or instead of those shown, and some elements may be omitted altogether. Further, many of the elements described herein are functional entities that may be implemented as discrete or distributed components or in conjunction with other components. Various functions described herein as being performed by one or more entities may be carried out by hardware, firmware, and/or software. For instance, various functions may be carried out by a processor executing instructions stored in memory.

The illustrated exemplary environment 100 may include a user device 110, a content creation server 120, and a search engine server 140. Each of the components shown in FIG. 1 may be any type of computing device. The components may communicate with each other via a network 130, which may include, without limitation, one or more local area networks (LANs) and/or wide area networks (WANs). Such networking environments are commonplace in offices, enterprise-wide computer networks, intranets and the Internet. It should be understood that any number of user devices, content creation servers and search engine servers may be employed within the environment 100 within the scope of the present disclosure. Each may comprise a single device or multiple devices cooperating in a distributed way. For instance, the content creation server 120 may comprise multiple devices arranged in a distributed way that collectively provide the functionality of the content creation server 120 described herein.

The user device 110 may be configured in a variety ways. For example, the user device 110 may be configured as a traditional computer (such as a desktop personal computer, laptop personal computer and so on), an entertainment appliance, a smart phone, a netbook, a tablet and so on. Thus the user device 110 may range from a full resource device with substantial memory and processor resources (e.g., personal computers) to a low-resource device with limited memory and/or processing resources (e.g., hand-held game controls).

The content creation server 120 may be configured to create all types of contents and build an index for these contents. In the present disclosure, the content creation server 120 may be configured to detect contents expressing emotions from one or more videos. The content creation server 120 may include a video analyzing component 122 and an index building component 124. Optionally, the content creation server 120 may further include an index enriching component 126.

The video analyzing component 122 may be configured to divide a video, such as a hot video, into a plurality of clips and analyze the plurality of clips to detect one or more clips expressing emotions from the plurality of clips. The analyzing may comprise performing, on each of the plurality of clips, speech recognition to know what the people in the clip is speaking. The analyzing may further comprise performing face recognition on the clip to know who the most important person is in the video and identify if the person is a celebrity. The analyzing may further comprise performing face emotion classification and speech emotion classification on the clip to know the person's emotion. The analyzing may further comprise performing action detection on the clip to know what the person is doing in the clip. The analyzing may further comprise performing human gesture classification on the clip to know the person's gesture. The analyzing may further comprise performing scene classification on the clip to know what the overall scene looks like. The analyzing may further comprise performing sound (e.g., music) classification on the clip to obtain the sound category so as to determine a scene type from an audio. The analyzing may further comprise performing bullet-curtain detection and classification on the clip to know comment count and category on the clip. Those skilled in the art will understand that the analyzing is not limited to those as described.

The video analyzing component 122 may be configured to extract features from each of the plurality of clips based on analyzing the clip. Then the video analyzing component 122 may be configured to determine, for each of the plurality of clips, whether the clip expresses emotions based on the features associated with the clip which may include the features extracted from the clip and the features extracted from at least one clip next to the clip of the plurality of clips. Thereafter, the video analyzing component 122 may determine whether there is one or more clips expressing emotions among the plurality of clips. If there is the one or more clips, then the video analyzing component 122 may provide the one or more clips and the features associated with them to the index building component 124.

The index building component 124 may be configured to build an index containing clips expressing human emotions provided by the video analyzing component 122 based on the features associated with these clips.

The index enriching component 126 may be configured to enrich an existing image index and/or the index built by the index building component 124. For each clip, the index enriching component 126 may search web pages or a database containing images pre-retrieved from web pages for an image similar to the clip based on the features extracted from the clip. If there is at least one similar image, then the index enriching component 126 may be configured to enrich an image index containing the at least one similar image using the features extracted from the clip and the features extracted from at least one clip next to the clip. Furthermore, the index enriching component 126 may be configured to enrich the image index using metadata associated with the video. Moreover, the index enriching component 126 may be further configured to enrich the index built by the index building component 124 using an image index containing images from web pages similar to at least one clip contained in the built index.

The search engine server 140 generally may operate to receive search queries from user devices, such as the user device 110, and provide search results in response to the search queries. The search engine server 140 may include a user interface component 142, a matching component 144 and a ranking component 146.

The user interface component 142 may provide an interface to the user device 110, which allows users to submit search queries to the search engine server 140 and to receive search results from the search engine server 140. The user device 110 may be any type of computing devices employed by a user to submit search queries and receive search results. By way of example only and not limitation, the user device 110 may be a desktop computer, a laptop computer, a tablet computer, a mobile device, or other type of computing device. The user device 110 may include an application that allows a user to enter a search query and submit the search query to the search engine server 140 to retrieve search results. For instance, the user device 110 may include a web browser that includes a search input box or allows a user to access a search page to submit a search query. Other mechanisms for submitting search queries to search engines are contemplated to be within the scope of the present disclosure.

When a search query is received via the user interface component 142, the matching component 144 may understand the query intention and break the query into different terms and/or entities, and employ these terms/entities to query the index built by the index building component 124 and enriched by the index enriching component 126, and identify a set of matching clips.

The set of matching clips may be evaluated by the ranking component 146 to provide a set of ranked clips. The ranking component 146 may indicate the set of ranked clips to the user interface component 142. The user interface component 142 may then communicate search results including at least a portion of the set of ranked clips to the user device 110. For instance, the user interface component 142 may generate or otherwise provide a search engine results page listing search results based on the set of ranked clips.

In FIG. 1, an environment in which a search engine server 140 may search the content creation server 120 for the contents which a user wants. However, the present disclosure may not be limited to the environment. For example, a user may download the built index to the user device 110. When the user types anything that has potential emotion expression into the user device 110, relevant clips will be populated for the user to choose. This can help the user to express their emotions by showing representative GIF instead of text in SMS, Email, SNS, etc.

Having described an exemplary operating environment in which the techniques described herein may be employed, consider now a discussion of various embodiments.

Figure 2:
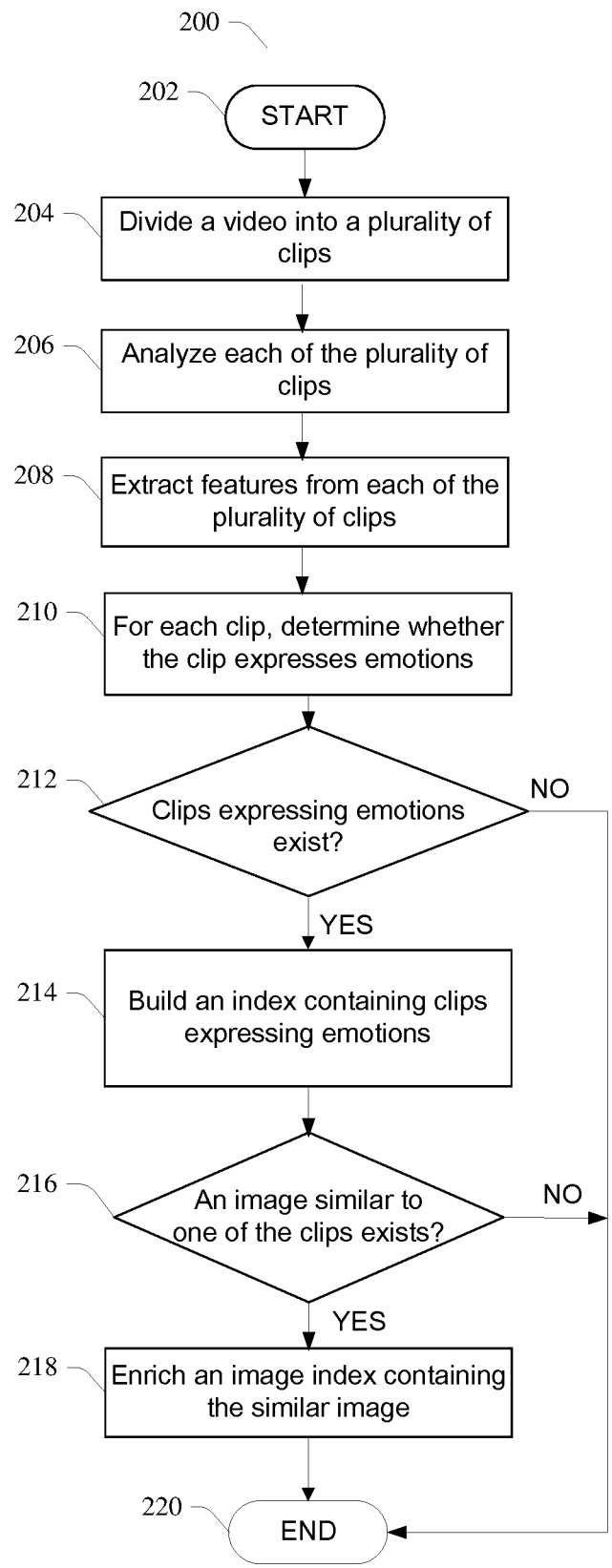
FIG. 2 illustrates a flow chart of a method for detecting contents expressing emotions from a video.
Figure 3:
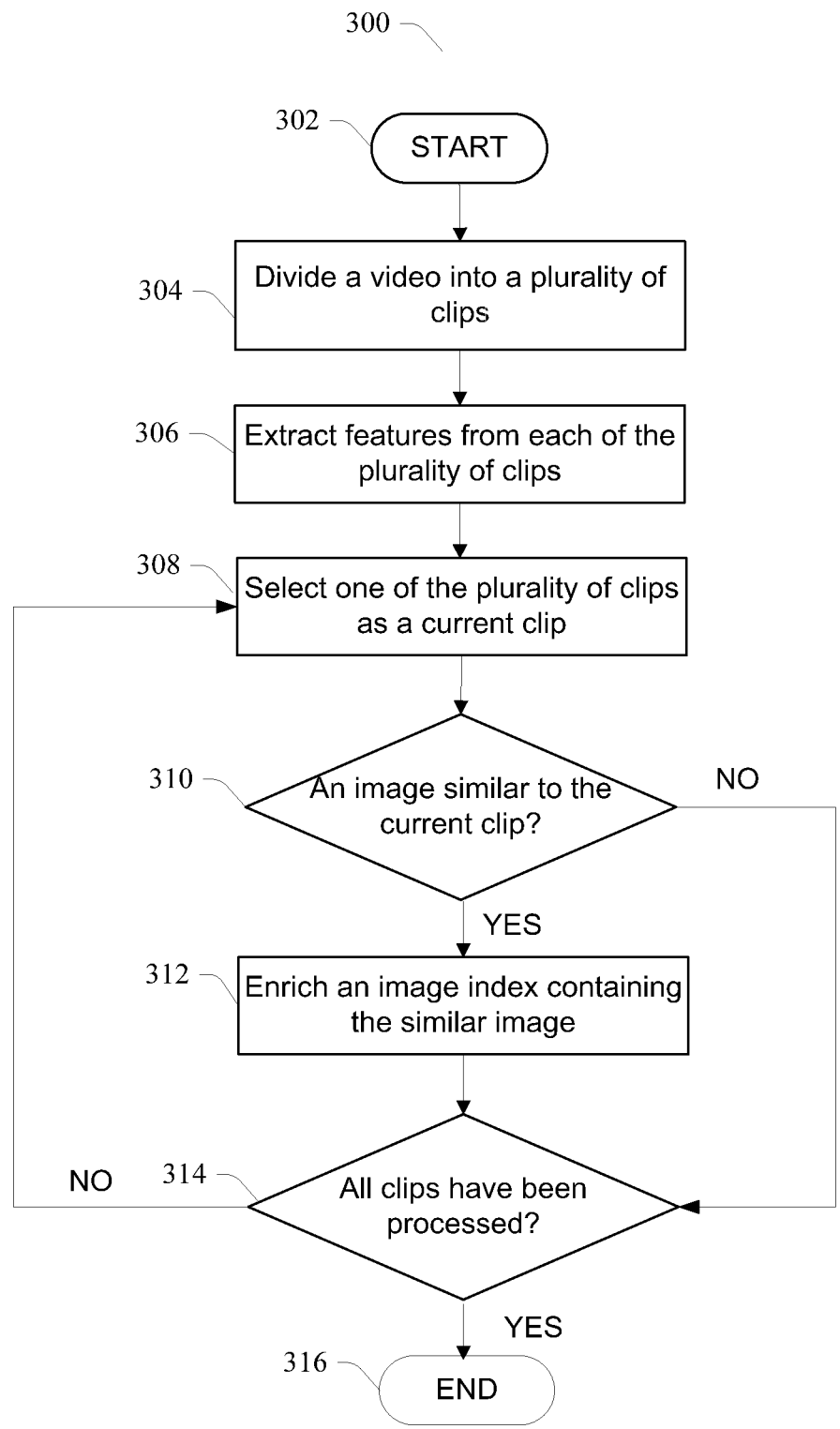
FIG. 3 illustrates a flow chart of a method for enriching an image index.

Referring now to FIGS. 2-3, methodologies that can be performed according to various aspects set forth herein are illustrated. While, for purposes of simplicity of explanation, the methodologies are shown as a series of acts, it is to be understood and appreciated that the methodologies are not limited by the order of acts, as some acts can, in accordance with one or more aspects, occur in different orders and/or concurrently with other acts from that shown and described herein.

FIG. 2 illustrates a flow chart of a method 200 for detecting contents expressing emotions from a video according to an embodiment of the present disclosure.

The method 200 may start at block 202. At block 204, the video may be divided into a plurality of clips. For example and without limitations, each clip may be about 1-5 seconds level. The start and end time of each clip may be determined by at least one of shot detection, sub-shot detection, speech detection, speech recognition and object motion detection. Clear clip boundaries may be obtained by composition of shot detection, sub-shot detection, speech detection, speech recognition and object motion detection.

At block 206, each of the plurality of clips may be analyzed. For example, speech recognition may be performed on each of the plurality of clips so as to know what a person is speaking. Face recognition/identification may be performed on each of the plurality of clips so as to know who the most important person is in the clip, and identify if the person is a celebrity. Face emotion classification and speech emotion classification may be performed on each of the plurality of clips so as to know the person's emotion. Action detection may be performed on each of the plurality of clips so as to know what the person is doing in the clip. Human gesture classification may be performed on each of the plurality of clips so as to know the person's gesture. Scene classification may be performed on each of the plurality of clips so as to know what the overall scene looks like. Sound/music classification may be performed on each of the plurality of clips so as to obtain the scene type from an audio. Furthermore, camera motion detection may be performed on each of the plurality of clips so as to know camera motion, such as pan, tilt, zoom etc. Bullet-curtain detection and classification may also be performed on each of the plurality of clips so as to know comment count and category on the clip.

At block 208, features may be extracted from each of the plurality of clips based on analyzing the clip. For example, speech transcripts may be extracted from a clip based on the speech recognition of the clip. Human identity may be extracted from the clip based on the face recognition/identification of the clip. Human emotions may be extracted from the clip based on the face emotion classification and speech emotion classification of the clip. Action or event may be extracted from the clip based on the action detection of the clip. Human gestures may be extracted from the clip based on the human gesture classification of the clip. Scene categories may be extracted from the clip based on the scene classification of the clip. Sound category may be extracted from the clip based on the sound classification of the clip. Camera motion may be extracted from the clip based on the camera motion detection of the clip. Comment count and category on the clip may be extracted from the clip based on the bullet-curtain detection and classification of the clip.

At block 210, for each of the plurality of clips, it may be determined whether the clip expresses emotions based on the features associated with the clip including the features extracted from the clip and at least one other clip of the plurality of clips. The clip and the at least one other clip may be next to each other. In an embodiment of the present disclosure, a pre-trained model which was trained with a training dataset may be used to determine whether the clip expresses emotions based on the features associated with the clip.

At diamond 212, it may be determined whether there is one or more clips expressing emotions among the plurality of clips based on the result of block 210.

If it is determined that there is no clip expressing emotions among the plurality of clips at diamond 212, the method 200 may go to block 220 to end.

If it is determined that there is one or more clips expressing emotions at diamond 212, the method may go to block 214. At block 214, an index containing the one or more clips may be built based on the features associated with the one or more clips. In the present disclosure, when building the index, not only the features extracted from the one or more clips, but also the features extracted from the clips next to the one or more clips are used, which will help retrieve the these contents.

Furthermore, metadata associated with the video may also be used to build the index. The metadata may include title, creator, description, actors, and characters and so on.

At diamond 216, it may be determined whether there is at least one image from web pages which is similar to at least one of the one or more clips expressing emotions. Web pages or a database containing images pre-retrieved from web pages may be searched for such a similar image based on the features extracted from the at least one clip.

If it is determined that there is no image similar to the one or more clips at diamond 216, the method 200 may go to block 220 to end. If it is determined that there is at least one image similar to at least one of the one or more clips at diamond 216, the method 200 may go to block 218. At block 218, an image index containing the at least one image may be enriched based on the features associated with the at least one clip. Then the method 200 may go to block 220 to end.

The method shown in FIG. 2 may be performed on a plurality of videos so as to proactively find clips expressing emotions without human interfering. Then an index containing all clips expressing emotions detected from the plurality of videos may be built based on the features associated with these clips. Moreover, the built index may be enriched based on the image index.

FIG. 3 illustrates a flow chart of a method 300 for enriching an image index according to an embodiment of the present disclosures.

The method 300 may start at block 302. At block 304, a video may be divided into a plurality of clips. The start and end time of each clip may be determined by at least one of shot detection, sub-shot detection, speech detection, speech recognition and object motion detection. Clear clip boundaries may be obtained by composition of shot detection, sub-shot detection, speech detection, speech recognition and object motion detection.

At block 306, features may be extracted from each of the plurality of clips. The features extracted from each of the plurality or clips may include at least one of speech transcripts, human identity, human emotions, action or event, human gesture, scene category, sound category camera motion and comment count and category and so on extracted from the clip.

At block 308, one of the plurality of clips may be selected as a current clip to be processed. In the first iteration, the first clip of the plurality of clips may be selected as the current clip.

At diamond 310, it may be determined whether there is at least one image from web pages which is similar to the current clip based on the features extracted from the current clip. For example, web pages or a database containing images pre-retrieved from web pages may be searched for similar images based on the features extracted from the current clip.

If it is determined that there is no similar image from web pages at diamond 310, the method 300 may go to block 314. If it is determined that there is at least one similar image at diamond 310, the method 300 may go to block 312. At block 312, an image index containing the at least one similar image may be enriched based on the features extracted from the current clip and the features extracted from at least one clip next to the current clip. Moreover, the image index may be further enriched based on metadata associated with the video.

At diamond 314, it may be determined whether all of the plurality of clips have been processed. If all clips have been processed, the method 300 may go to block 316 to end. Otherwise, the method 300 may go to block 308 at which one of the unprocessed clips may be selected as the current clip, and diamond 310, block 312 and diamond 314 may be repeated.

Figure 4:
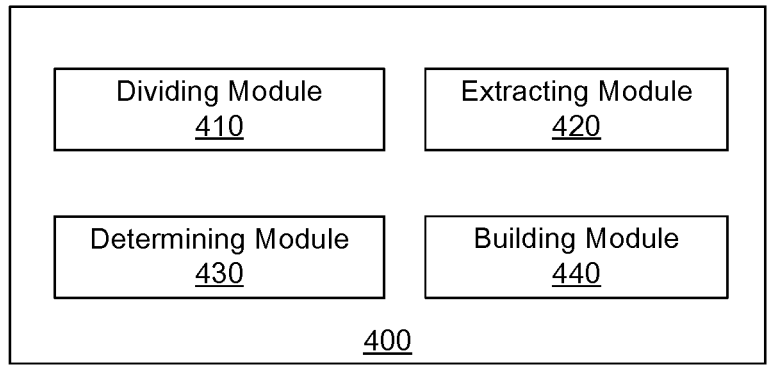
FIG. 4 illustrates an exemplary apparatus for detecting contents expressing emotions from a video.

FIG. 4 illustrates an exemplary apparatus 400 for detecting contents expressing emotions from a video.

The apparatus 400 may comprise a dividing module 410 configured to divide the video into a plurality of clips. The apparatus 400 may further comprise an extracting module 420 configured to extract, from a first clip and at least one second clip of the plurality of clips, features associated with the first clip. The first clip and the at least one second clip may be next to each other. The apparatus 400 may further comprise a determining module 430 configured to determine whether the first clip expresses emotions based on the features associated with the first clip. The apparatus 400 may further comprise a building module 440 configured to, build an index containing the first clip based on the features associated with the first clip if the first clip expresses emotions.

In an embodiment of the present disclosure, the dividing module 410 may be further configured to divide the video into the plurality of clips by at least one of shot detection, sub-shot detection, speech detection, speech recognition and object motion detection. By composition of shot detection, sub-shot detection, speech detection, speech recognition and object motion detection, clear clip boundaries may be obtained.

In an embodiment of the present disclosure, the apparatus 400 may further comprise an analyzing module configured to analyze the first clip and the at least one second clip. The extracting module 420 may be further configured to extract, from the first clip and the at least one second clip, the features associated with the first clip based on the analysis. The analyzing module may be further configured to perform at least one of speech recognition, face recognition, action detection, human gesture classification, face emotion classification, speech emotion classification, scene classification, sound classification, camera motion detection and bullet-curtain detection and classification on the first clip and the at least one second clip. The features associated with the first clip may include at least one of speech transcripts, action or event, person gesture, person identity, person emotions, scene category, sound category, camera motion and comment count and category extracted from the first clip and the at least one second clip.

In an embodiment of the present disclosure, the determining module 430 may be further configured to, determine, by a pre-trained model, whether the first clip expresses emotions based on the features associated with the first clip. The pre-trained model may be a classifier trained with a training dataset for identifying a clip expressing emotions.

In an embodiment of the present disclosure, the building module 440 may be further configured to build the index based on the features associated with the first clip and metadata associated with the video. The metadata may include at least one of title, creator, description, actors, and characters of the video.

In an embodiment of the present disclosure, the apparatus 400 may further comprise an enriching module configured to enrich, based on the features associated with the first clip, an image index containing at least one image from web pages which is similar to the first clip. The at least one image may be found from the image index based on feature similarity.

Moreover, the apparatus 400 may also comprise any other modules configured for implementing functionalities corresponding to any steps of the method for detecting contents expressing emotions according to the present disclosure.

Figure 5:
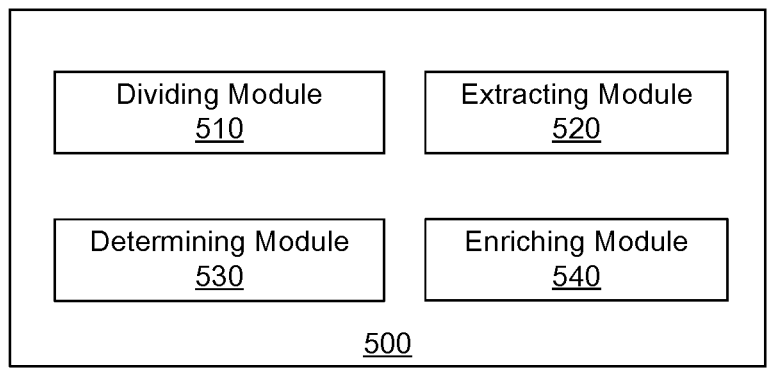
FIG. 5 illustrates an exemplary apparatus for enriching an image index.

FIG. 5 illustrates an exemplary apparatus 500 for enriching an image index.

The apparatus 500 may comprise a dividing module 510 configured to divide a video into a plurality of clips. The apparatus 500 may further comprise an extracting module 520 configured to extract features from a first clip of the plurality of clips. The apparatus 500 may further comprise a determining module 530 configured to determine whether there is at least one image from web pages that is similar to the first clip based on the features extracted from the first clip. The apparatus 500 may further comprise an enriching module 540 configured to if there is the at least one image that is similar to the first clip, enrich an image index containing the at least one image based on the features extracted from the first clip and the features extracted from at least one second clip of the plurality of clips. The at least one second clip may be next to the first clip.

In an embodiment of the present disclosure, the apparatus 500 may further comprise an analyzing module configured to analyze the first clip. The extracting module 520 may be further configured to extract the features from the first clip based on the analysis.

In an embodiment of the present disclosure, the analyzing module may be configured to perform at least one of speech recognition, face recognition, face emotion classification, speech emotion classification, action detection, human gesture detection, scene classification, sound (e.g., music) classification, camera motion detection and bullet-curtain detection and classification on the first clip. The extracting module 520 may be further configured to extract at least one of speech transcripts, action or event, person gesture, person emotions, person identity, scene category, sound category, camera motion, comment count and category and other features from the first clip.

In an embodiment of the present disclosure, the apparatus 500 may further comprise an obtaining module configured to obtain metadata associated with the video. The metadata may include at least one of title, creator, description, actors, and characters of the video. The enriching module 530 may be further configured to enrich the image index containing the at least one similar image based on the metadata.

Figure 6:
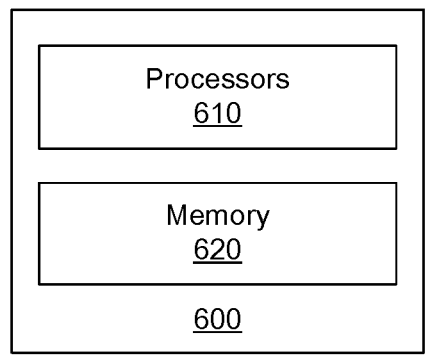
FIG. 6 illustrates an exemplary system for detecting contents expressing emotions from a video.

FIG. 6 illustrates an exemplary system 600 for detecting contents expressing emotions. The system 600 may comprise one or more processors 610. The system 600 may further comprise a memory 620 that is coupled with the one or more processors. The memory 620 may store computer-executable instructions that, when executed, cause the one or more processors to perform any steps of the method for detecting contents expressing emotions according to the present disclosure.

The system 600 shown in FIG. 6 may also be used for enriching an image index according to the present disclosure. In this case, the memory 620 may store computer-executable instructions that, when executed, cause the one or more processors to perform any steps of the method for enriching an image index according to the present disclosure.

The solution of the present disclosure may be embodied in a non-transitory computer-readable medium. The non-transitory computer-readable medium may comprise instructions that, when executed, cause one or more processors to perform any steps of the method for detecting contents expressing emotions or the method for enriching an image index according to the present disclosure.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

It is to be understood that the order of steps in the methods disclosed is an illustration of exemplary processes. Based upon design preferences, it is understood that the order of steps in the methods may be rearranged.

The detailed disclosure now turns to providing examples that pertain to further embodiments. Examples provided below are intended to be exemplary and non-limiting.

In an example, a method for detecting contents expressing emotions from a video may comprise: dividing the video into a plurality of clips; extracting, from a first clip and at least one second clip of the plurality of clips, features associated with the first clip; determining whether the first clip expresses emotions based on the features associated with the first clip; and building an index containing the first clip based on the features associated with the first clip if the first clip expresses emotions. The at least one second clip may be next to the first clip.

In another example, the dividing may comprise: dividing the video into the plurality of clips by at least one of shot detection, sub-shot detection, speech detection, speech recognition and object motion detection.

In another example, the extracting may comprise: analyzing the first clip and the at least one second clip; and extracting, from the first clip and the at least one second clip, the features associated with the first clip based on the analyzing.

In another example, the analyzing may comprise: performing at least one of speech recognition, face recognition, action detection, human gesture classification, face emotion classification, speech emotion classification, scene classification, sound classification, camera motion detection and bullet-curtain detection and classification on the first clip and the at least one second clip.

In another example, the features associated with the first clip may include at least one of speech transcripts, action or event, person gesture, person identity, person emotions, scene category, sound category, camera motion and comment count and category extracted from the first clip and the at least one second clip.

In another example, the determining may comprise: determining, by a pre-trained model, whether the first clip expresses emotions based on the features associated with the first clip.

In another example, the building may be further based on metadata associated with the video. The metadata may include at least one of title, creator, description, actors, and characters of the video.

In another example, the method may further comprise enriching, based on the features associated with the first clip, an image index containing at least one image from web pages which is similar to the first clip.

In another example, the method may further comprise: searching web pages or a database containing images pre-retrieved from web pages for the at least one image based on the features extracted from the first clip.

In another example, an apparatus for detecting contents expressing emotions from a video may comprise: a dividing module configured to divide the video into a plurality of clips; an extracting module configured to extract, from a first clip and at least one second clip of the plurality of clips, features associated with the first clip; a determining module configured to determine whether the first clip expresses emotions based on the features associated with the first clip; and a building module configured to build an index containing the first clip based on the features associated with the first clip if the first clip expresses emotions.

In another example, the dividing module may be further configured to: divide the video into the plurality of clips by at least one of shot detection, sub-shot detection, speech detection, speech recognition and object motion detection.

In another example, the apparatus may further comprise an analyzing module configured to analyze the first clip and the at least one second clip. The extracting module may be further configured to extract, from the first clip and the at least one second clip, the features associated with the first clip based on the analysis.

In another example, the analyzing module may be further configured to perform at least one of speech recognition, face recognition, action detection, human gesture classification, face emotion classification, speech emotion classification, scene classification, sound classification, camera motion detection and bullet-curtain detection and classification on the first clip and the at least one second clip.

In another example, the features associated with the first clip may include at least one of speech transcripts, action or event, person gesture, person identity, person emotions, scene category, sound category, camera motion and comment count and category extracted from the first clip and the at least one second clip.

In another example, the determining module may be further configured to determine, by a pre-trained model, whether the first clip expresses emotions based on the features associated with the first clip.

In another example, the building module may be further configured to build the index based on the features associated with the first clip and metadata associated with the video. The metadata may include at least one of title, creator, description, actors, and characters of the video.

In another example, the apparatus may further comprise an enriching module configured to enrich, based on the features associated with the first clip, an image index containing at least one image from web pages which is similar to the first clip.

In another example, a method for enriching an image index may comprise: dividing a video into a plurality of clips; extracting features from a first clip of the plurality of clips; determining whether there is at least one image from web pages that is similar to the first clip based on the features extracted from the first clip; and if there is the at least one image, enriching an image index containing the at least one image based on the features extracted from the first clip and the features extracted from at least one second clip of the plurality of clips. The first clip and the at least one second clip may be next to each other.

In another example, the method may further comprise analyzing the first clip. The extracting may comprise extracting features from the first clip based on the analysis.

In another example, the analyzing may comprise performing at least one of speech recognition, face recognition, action detection, human gesture classification, face emotion classification, speech emotion classification, scene classification, sound classification, camera motion detection and bullet-curtain detection and classification on the first clip.

In another example, the features extracted from the first clip may include at least one of speech transcripts, action or event, person gesture, person identity, person emotions, scene category, sound category, camera motion and comment count and category extracted from the first clip.

In another example, the method may further comprise obtaining metadata associated with the video. The enriching may comprise enriching the image index based on the metadata. The metadata may include at least one of title, creator, description, actors, and characters of the video.

In another example, an apparatus for enriching an image index may comprise: a dividing module configured to divide a video into a plurality of clips; an extracting module configured to extract features from a first clip of the plurality of clips; a determining module configured to determine whether there is at least one image from web pages that is similar to the first clip based on the features extracted from the first clip; and an enriching module configured to if there is the at least one image, enrich an image index containing the at least one image based on the features extracted from the first clip and the features extracted from at least one second clip of the plurality of clips. The first clip and the at least one second clip may be next to each other.

In another example, the apparatus may further comprise an analyzing module configured to analyze the first clip. The extracting module may be further configured to extract features from the first clip based on the analysis.

In another example, the analyzing module may be configured to perform at least one of speech recognition, face recognition, action detection, human gesture classification, face emotion classification, speech emotion classification, scene classification, sound classification, camera motion detection and bullet-curtain detection and classification on the first clip.

In another example, the features extracted from the first clip may include at least one of speech transcripts, action or event, person gesture, person identity, person emotions, scene category, sound category, camera motion and comment count and category extracted from the first clip.

In another example, the apparatus may further comprise an obtaining module configured to obtain metadata associated with the video. The enriching module may be further configured to enrich the image index based on the metadata. The metadata may include at least one of title, creator, description, actors, and characters of the video.

In another example, a system may comprise: one or more processors; and a memory, storing computer-executable instructions that, when executed, cause the one or more processors to perform the method according to the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for detecting contents expressing emotions from a video, the method comprising:
   dividing the video into a plurality of clips based on sub-shot detection and speech recognition, wherein start points and end points for the plurality of clips are identified using the sub-shot detection and the speech recognition, wherein the speech recognition generates a transcript for speech obtained from the plurality of clips;
   extracting, from a first clip and at least one second clip of the plurality of clips, features associated with the first clip, wherein the first clip and the at least one second clip share a time boundary of the video;
   determining whether the first clip expresses emotions based on an evaluation of the features associated with the first dip by an emotion classifier;
   building an index containing the first clip based on the features associated with the first clip that express emotions in a searchable content index that includes a plurality of searchable clips indexed to corresponding emotions;
   receiving a search query; and
   returning the first clip based on a match between an emotion indicated by the search query and an emotion corresponding to the first clip as indicated in the searchable context index.

2. The method of claim 1, wherein the at least one second clip is next to the first clip.

3. The method of claim 1, wherein the dividing further comprises:
   dividing the video into the plurality of clips includes identifying the start points and end points using shot detection, speech detection, or object motion detection.

4. The method of claim 1, wherein the extracting comprises:
   analyzing the first clip and the at least one second clip; and
   extracting the features associated with the first clip based on the analyzing.

5. The method of claim 4, wherein the analyzing comprises:
   performing at least one of speech recognition, face recognition, action detection, human gesture classification, face emotion classification, speech emotion classification, scene classification, sound classification, camera motion detection, and bullet-curtain detection and classification on the first clip and the at least one second clip.

6. The method of claim 1, wherein the features associated with the first clip include at least one of speech transcripts, action or event, person gesture, person identity, person emotions, scene category, sound category, camera motion, and comment count and category extracted from the first clip and the at least one second clip.

7. The method of claim 1, wherein the determining comprises:
   determining, by a pre-trained model, whether the first clip expresses emotions based on the features associated with the first clip.

8. The method of claim 1, wherein the building is further based on metadata associated with the video.

9. The method of claim 8, wherein the metadata includes at least one of title, creator, description, actors, and characters of the video.

10. The method of claim 1, further comprising:
    enriching, based on the features associated with the first clip, an image index containing at least one image from web pages which is similar to the first clip.

11. The method of claim 10, further comprising:
    searching, based on the features extracted from the first clip, web pages or a database containing images pre-retrieved from web pages for the at least one image.

12. A system for detecting contents expressing emotions from a video, the system comprising:
    at least one processor;
    a storage device comprising instructions, which when executed by the at least one processor, configure the processor to perform operations to:
       divide the video into a plurality of clips based on sub-shot detection and speech recognition, wherein start points and end points for the plurality of clips are identified using the sub-shot detection and the speech recognition, wherein the speech recognition generates a transcript for speech obtained from the plurality of clips;

extract, from a first clip and at least one second clip of the plurality of clips, features associated with the first clip, wherein the first clip and the at least one second clip share a time boundary of the video;

determine whether the first clip expresses emotions based on an evaluation of the features associated with the first clip by an emotion classifier;

build an index containing the first clip based on the features associated with the first clip that express emotions in a searchable content index that includes a plurality of searchable clips indexed to corresponding emotions;

receive a search query; and return the first clip based on a match between an emotion indicated by the search query and an emotion corresponding to the first clip as indicated in the searchable context index.

13. The system of claim 12, wherein the at least one second clip is next to the first clip.

14. The system of claim 12, wherein the instructions to divide the video into a plurality of clips includes instructions that configure the processor to perform operations to:
divide the video into the plurality of clips by identification of the start points and end points using shot detection, speech detection, or object motion detection.

15. The system of claim 12, further comprising instructions that configure the processor to perform operations to analyze the first clip and the at least one second clip, and wherein the instructions to extract features associated with the first clip include instructions that configure the processor to perform operations to extract the features associated with the first clip based on the analysis.

16. The system of claim 15, wherein the instructions to analyze the first clip and the at least one second clip include instructions that configure the processor to perform operations to:
perform at least one of speech recognition, face recognition, action detection, human gesture classification, face emotion classification, speech emotion classification, scene classification, sound classification, camera motion detection, and bullet-curtain detection and classification on the first clip and the at least one second clip.

17. The system of claim 12, wherein the features associated with the first clip include at least one of speech transcripts, action or event, person gesture, person identity, person emotions, scene category, sound category, camera motion, and comment count and category extracted from the first clip and the at least one second clip.

18. The system of claim 12, wherein the instructions to build the index include instruction that configure the processor to perform operations to build the index based on the features associated with the first clip and metadata associated with the video.

19. The system of claim 12, further comprising instructions that configure the processor to perform operations to:
enrich, based on the features associated with the first clip, an image index containing at least one image from web pages which is similar to the first clip.

20. A non-transitory computer readable medium comprising instructions for detecting contents expressing emotions from a video, which when executed by at least one processor, configure the processor to perform operations comprising:
dividing the video into a plurality of clips based on sub-shot detection and speech recognition, wherein start points and end points for the plurality of clips are identified using the sub-shot detection and the speech recognition, wherein the speech recognition generates a transcript for speech obtained from the plurality of clips;

extracting, from a first clip and at least one second clip of the plurality of clips, features associated with the first clip, wherein the first clip and the at least one second clip share a time boundary of the video;

determining whether the first clip expresses emotions based on an evaluation of the features associated with the first clip by an emotion classifier;

building an index containing the first clip based on the features associated with the first clip that express emotions in a searchable content index that includes a plurality of searchable clips indexed to corresponding emotions;

receiving a search query; and returning the first clip based on a match between an emotion indicated by the search query and an emotion corresponding to the first clip as indicated in the searchable context index.

* * * * *